United States Patent [19]

Frimmel, Jr. et al.

[11] Patent Number: 4,875,157
[45] Date of Patent: Oct. 17, 1989

[54] ALTERNATE MEMORY ADDRESSING FOR INFORMATION STORAGE AND RETRIEVAL

[75] Inventors: James J. Frimmel, Jr., San Diego, Calif.; Thomas Ouellette, Fairfax; Richard N. Deglin, Reston, both of Va.

[73] Assignee: International Telesystems Corporation, Herndon, Va.

[21] Appl. No.: 27,240

[22] Filed: Mar. 18, 1987

[51] Int. Cl.$^4$ .............................................. G06F 12/00
[52] U.S. Cl. ............................. 364/200; 365/189.04; 365/230.04; 364/228.1; 364/247.2
[58] Field of Search ... 364/200 MS File, 900 MS File; 340/825.52; 365/189.04, 230.04, 230.05

[56] References Cited

U.S. PATENT DOCUMENTS

| | | | |
|---|---|---|---|
| 3,936,806 | 2/1976 | Batcher | 364/200 |
| 4,069,970 | 1/1978 | Buzzard et al. | 364/900 |
| 4,603,383 | 7/1986 | Tanaka et al. | 364/200 |
| 4,616,310 | 10/1986 | Dill et al. | 364/200 |
| 4,620,118 | 10/1986 | Barber | 364/200 |
| 4,623,986 | 11/1986 | Chauvel | 364/900 |
| 4,623,990 | 11/1986 | Allen et al. | 365/189.04 |
| 4,654,654 | 3/1987 | Butler et al. | 340/825.52 |
| 4,725,987 | 2/1988 | Cates | 365/189.04 |
| 4,750,115 | 6/1988 | Sekiya et al. | 340/825.52 |

*Primary Examiner*—Gareth D. Shaw
*Assistant Examiner*—Debra A. Chun
*Attorney, Agent, or Firm*—Whitham & Marhoefer

[57] ABSTRACT

An apparatus for alternate memory addressing of a random access memory (RAM) allows a first processor to write into the memory on a row-by-row basis and a second processor to read out of the memory on a column-by-column basis. The memory is typically divided into a plurality of channels into which the first processor writes data for respective channels asynchronously by the use of twin RAMs. While one RAM is written to by the first processor, the second RAM is read from synchronously with automatic address translation.

8 Claims, 6 Drawing Sheets

ALTERNATE MEMORY ADDRESSING FOR INFORMATION STORAGE AND RETRIEVAL

BACKGROUND OF THE INVENTION

This invention relates to systems to record and reproduce digital data, especially data representing voice or other sounds in digitized form, when the data is to be used by two or more processors which access the data in different logical order.

Systems currently in use utilize software to convert the order of the data, either within a processor or within a buffer. A need exists to improve speed and quality of the order conversion, by performing the conversion using hardware alone, and without copying the data from one storage medium to another in the course of performing the conversion.

SUMMARY OF THE INVENTION

This invention relates to information processing means, especially high-speed digital computers and telecommunications systems utilizing random access information storage means such as high-speed random access memory (RAM). This invention provides a means to transform, in the process of electronic data transmission or addressing, the logical order of information.

The invention applies to any set of data elements which can be described by two indices, such as the row and column indices of a rectangular array. Thus rows can be regarded as variables, and columns as observations; or rows can be regarded as categories of data, and columns as ordered data elements within categories. For simplicity, hereafter, the term "channel" will be used for a row, and "frame" for a column, as these are the terms most familiar for this type of data in the computer and communications processing context.

One information processor writes into the storage medium information for each of a plurality of channels, one frame at a time. A second processor reads from the storage medium the same information one entire channel at a time, where there is a plurality of frames for each channel. A random access memory (RAM) is provided, addressable in such a way that the first processor can write one frame (column, if the data were written into a two-dimensional array) at a time, and addressed in such a way that the second processor can then read information for one channel (row of the two-dimensional array) at a time. The direction of reading and writing information can also be reversed, with the second processor writing information into the RAM and the first processor reading it from the RAM.

The RAM is accessed via a binary address, sixteen bits long in a preferred embodiment, which does not provide for "rows" and "columns". The present invention modifies the RAM address used by one processor to obtain the RAM address required by the other processor, without using any control software; that is, the addresses are modified by hardware alone. The address used by the first processor consists of a number of low-order bits (five, in a preferred embodiment) specifying the channel number and a number of high-order bits (eleven, in a preferred embodiment) specifying the frame number. In order to sort frame numbers within channel numbers, the five low-order bits specifying channel number are moved to the five high-order bit positions in the new address, while the eleven high-order bits specifying frame number are moved to the eleven low-order bit positions in the new address. The transformation is carried out by transmitting the address from a register on the first processor, through a wiring arrangement which rearranges the address bits as desired, via multiplexer circuits, to the address inputs of the RAM. The same mechanism accomplishes a comparable transformation from the second processor's address register to the address inputs of the RAM. The multiplexer circuits, which directly access the RAM, use the address in the form generated by the first processor regardless of which processor sent the request to read or write the information in the RAM; in this way, the second processor specifies addresses as if the information were in frame-within-channel order, while the first processor and the RAM handle the information in channel-within-frame order.

In another preferred embodiment, this invention utilizes two pages of RAM and two multiplexer circuits, each multiplexer circuit controlling access to one page of RAM. Each processor accesses one RAM page via the multiplexer circuit connected to that RAM page, and the connections of processors to RAMs via multiplexers are interchanged (paged or flip-flopped) every 25 milliseconds, to eliminate the need for arbitration circuitry and to provide each processor continuous access to RAM.

In addition, this invention makes the desired transformations when the data elements are each one hexadecimal word (sixteen bits) in length, but the storage media are designed to handle data elements one byte (eight bits) in length. In a preferred embodiment, each RAM consists of two byte-addressable RAM chips, each chip consisting of a number of 8-bit bytes, and the two chips designated as "HI" and "LO" to receive the high-order and low-order bytes, respectively, of a sixteen-bit word. The present invention transforms data addresses such that the first processor writes data efficiently into the RAM, with the high-order byte of a word (two channels of the same frame) always inserted into the "HI" RAM, and the corresponding low-order byte inserted into the "LO" RAM; but, in addition, when the second processor reads a word (two frames of the same channel) from the RAM, it also always reads the high-order byte from one RAM and the low-order byte from the other RAM, for maximum efficiency. Similar efficiency results when the second processor writes information into the RAM and the first processor reads the information.

The transformations are performed in the course of reading or writing, by wires connecting the second processor's address register and the multiplexer chips (which are connected to the RAM), as shown in detail in the drawings.

DETAILED DESCRIPTION OF THE INVENTION

Figure 1:
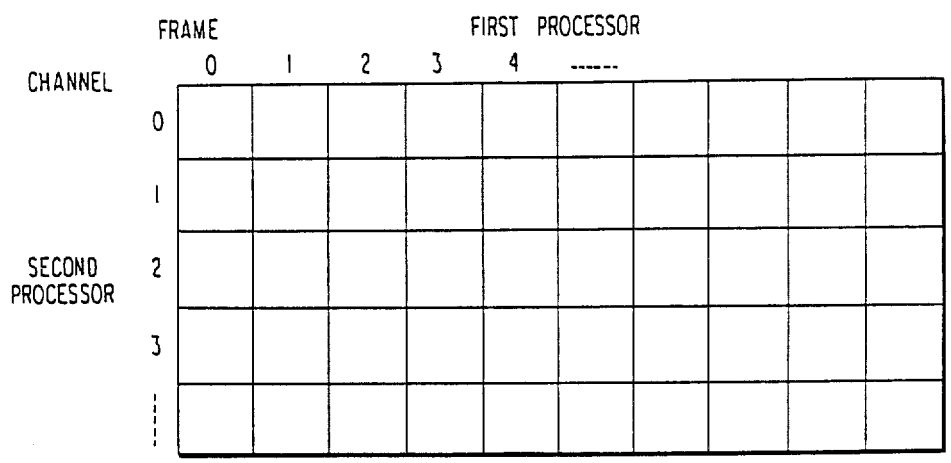
FIG. 1 is a diagram illustrating a two-dimensional array of RAM showing the addressing of two processors by frame and channel according to the invention.

Referring to FIG. 1, one information processing means simultaneously transmits information for a plurality of channels, one frame (column) at a time. A second information processing means reads the same information one channel (row) at a time, where there is a plurality of frames of information for each channel. A random access memory (RAM) is provided, as schematically illustrated in FIG. 1, addressable in such a way that the first processor can write one frame (column, in the drawing) at a time, and addressed in such a way that the second processor can then read information for one channel (row) at a time. The direction of reading and writing information can also be reversed, with the second processor writing information into the RAM one channel at a time and the first processor reading it from the RAM one frame at a time.

The RAM is accessed via a sixteen-bit address, which does not provide for "rows" and "columns". The present invention modifies the RAM address used by one processor to obtain the RAM address required by the other processor, without using any control software; that is, the addresses are modified by hardware alone.

Figure 2:
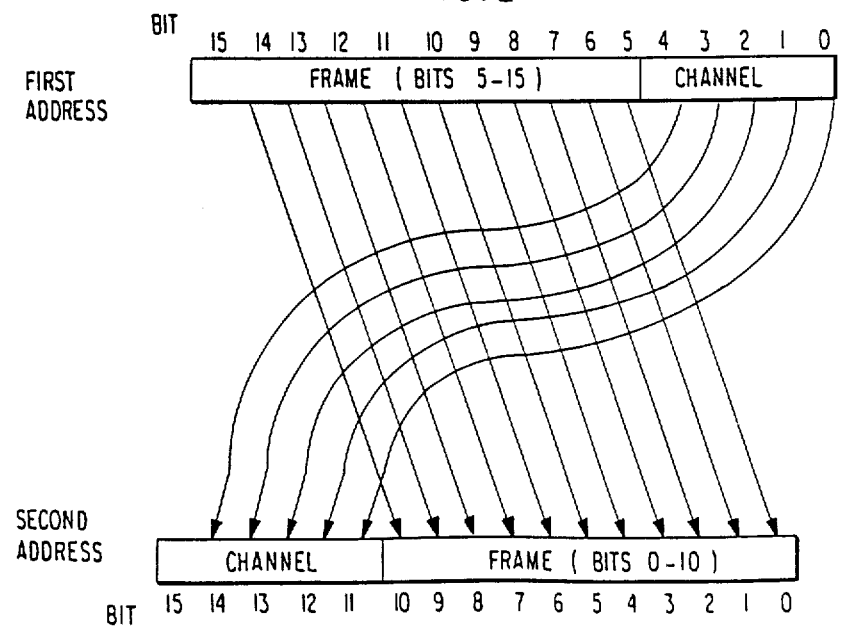
FIG. 2 is a block diagram showing an example of the address modifications performed according to one embodiment of the invention.

FIG. 2 shows the address modifications which this invention performs. The address used by the first processor consists of a number of low-order bits (five, in a preferred embodiment) specifying the channel number and a number of high-order bits (eleven, in a preferred embodiment) specifying the frame number. In order to sort frame numbers within channel numbers, the five low-order bits specifying channel number are moved to the five high-order bit positions in the new address, while the eleven high-order bits specifying frame number are moved to the eleven low-order bit positions in the new address. The transformation is carried out by transmitting the address from a register on the first processor, through a wiring arrangement as schematically shown, via multiplexer circuits, to the address inputs of the RAM. The same mechanism accomplishes a comparable transformation from the second processor's address register to the address inputs of the RAM. The multiplexer circuits, which directly access the RAM, use the address in the form generated by the first processor regardless of which processor sent the request to read or write the information in the RAM; in this way, the second processor specifies addresses as if the information were in frame-within-channel order, while the first processor and the RAM handle the information in channel-within-frame order.

Figure 3:
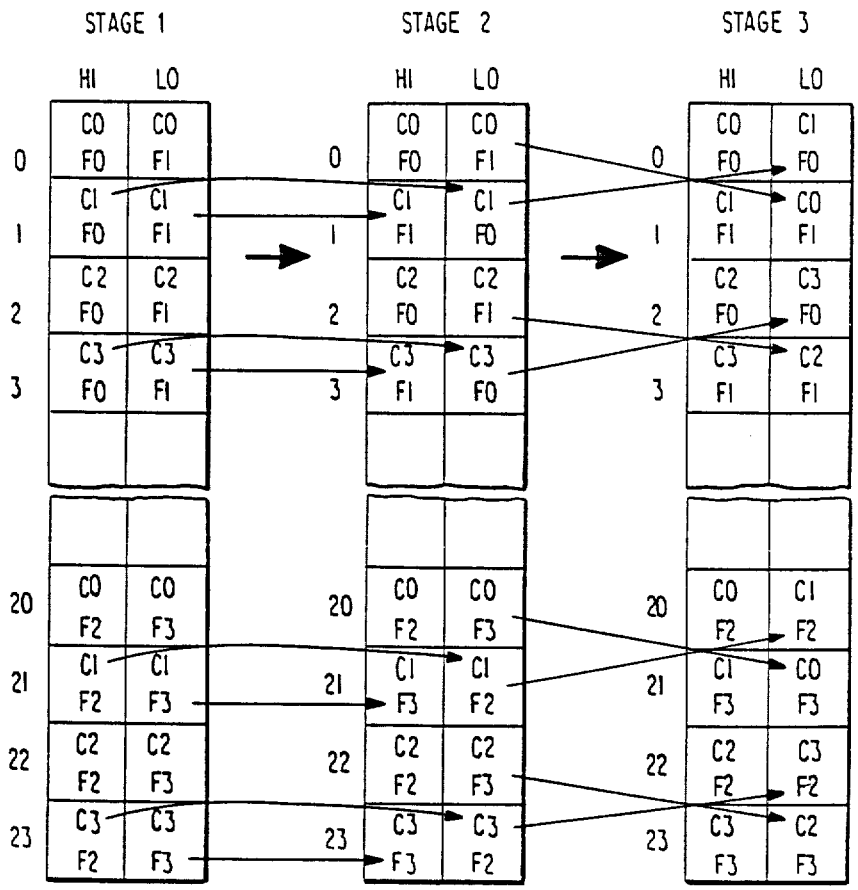
FIG. 3 is a block diagram illustrating the transformation of RAM addressing in the preferred embodiment of the invention using a 16-bit or 2-byte word.

In a preferred embodiment shown schematically in FIG. 3, the RAM consists of two byte-addressable RAM chips, each chip consisting of a number of 8-bit bytes, and the two chips designated as "HI" and "LO" to receive the high-order and low-order bytes, respectively, of a sixteen-bit word. FIG. 3 illustrates the transformations which are performed: The first column in FIG. 3 shows the information loaded by the second processor into certain address points in the two RAM chips. (Note: all addresses are shown in hexadecimal notation.) The first transformation is to swap the HI and LO bytes on odd addresses in the first stage, that is, for odd-numbered channels. This produces the re-addressing shown in the second stage. Next the low-order address bit is inverted for all addresses in the low-order RAM, producing the re-addressing shown in the third stage.

Figure 4:
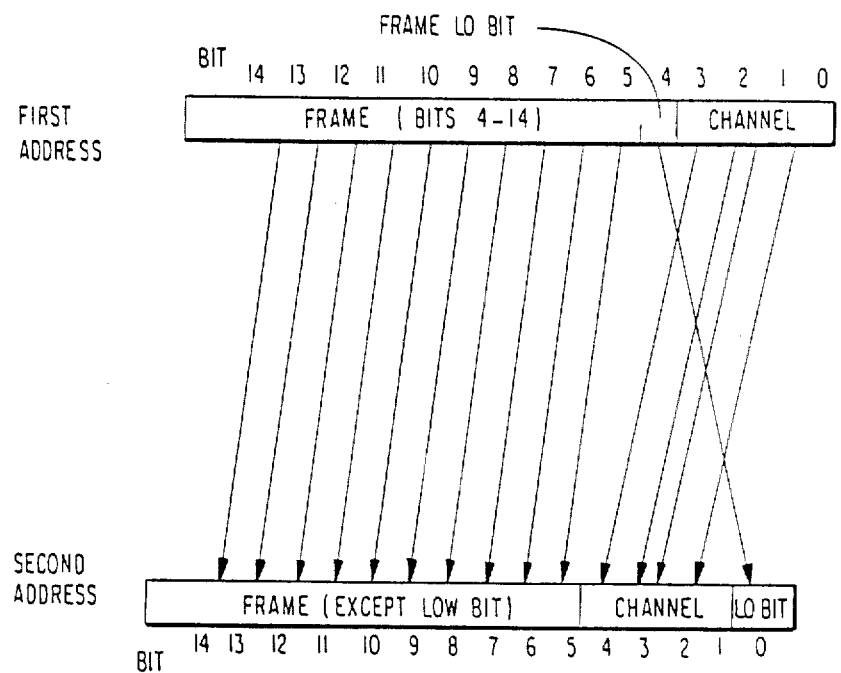
FIG. 4 is a block diagram showing the manner of modifying the counter address which causes the processor to read every other word while progressing sequentially through an address range.

Now the counter address, used by the first processor to address the combined RAM's, is transformed by moving the fourth bit of the counter address to become the new low-order bit, as shown in FIG. 4. This causes the processor to read every other word while progressing sequentially through an address range.

Figure 5:
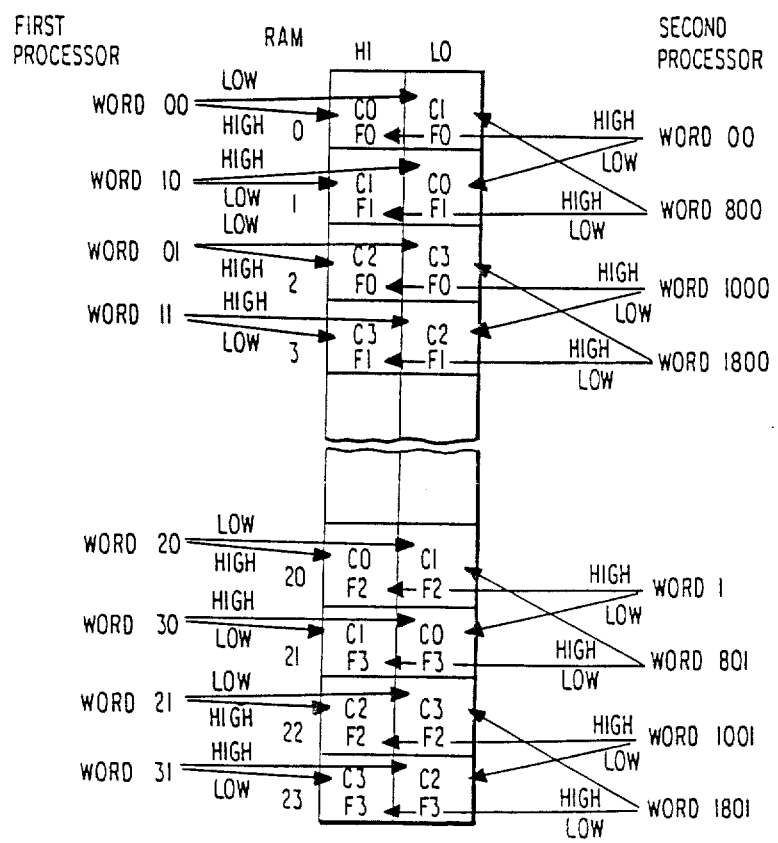
FIG. 5 is a block diagram illustrating the manner in which bytes are swapped in input and output on odd-numbered frames.

Finally, the bytes are swapped in input and output an odd-numbered frames (addresses for which the low-order bit in the transformed counter is 1), so that processors access data as shown in FIG. 5. The first processor's first address (word 0) corresponds to byte 0 of the HI RAM (in the high-order bits of the word) and byte 0 of the LO RAM (in the low-order bits of the word), and so on, while the second professor's first address (word 0) consists of byte 0 of the HI RAM (in the high-order bits of the word) and byte 1 of the LO RAM (in the low-order bits of the word).

Figure 6:
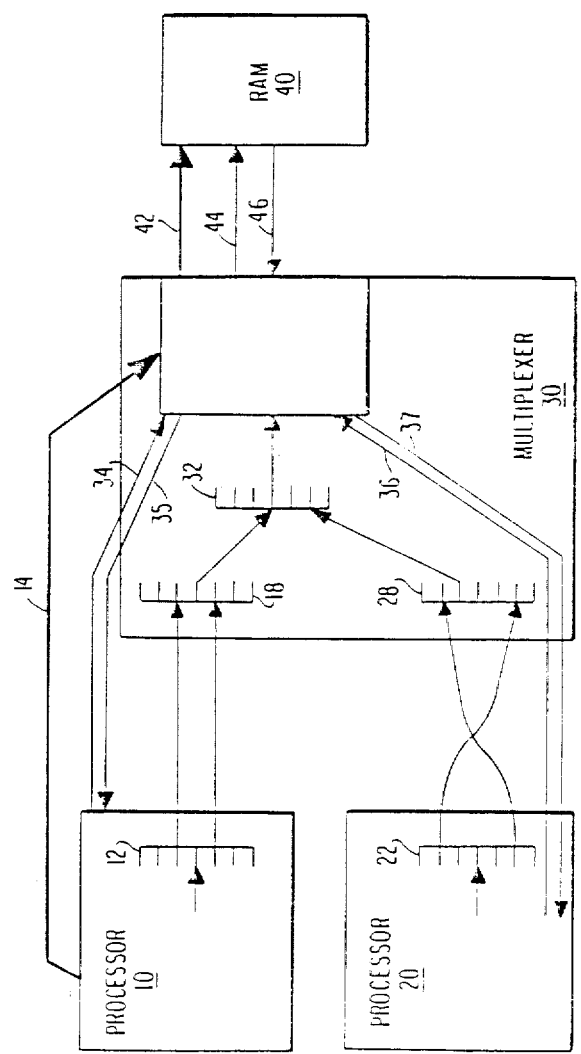
FIG. 6 is a block diagram showing the basic hardware configuration according to the general principles of the invention.

The transformations are performed in the course of reading or writing, by wires connecting the second processor's address register 22 and the multiplexer (MUX) circuit 30 (which is connected to the RAM), as shown schematically in FIG. 6. The first processor 10 loads its address register 12 with the address of the desired information in RAM, and transmits this address, without transmission, to address register 18 of the multiplexer 30. Similarly, second processor 20 loads its address register 22 with the address of the desired information in RAM 40 and transmits this address, transformed as explained in conjunction with FIG. 2, to multiplexer address register 28. A gate circuit in the multiplexer 30, controlled by command connection 14 from the first processor 10, chooses which transmitted address to load into address register 32, which is used to address RAM 40 via control connection 42 and thereby to cause data to be written to the RAM via connection 44, or read from the RAM via connection 46.

When processor 10 is connected to the RAM 40 via the multiplexer 30, data is transmitted to the RAM 40 via the multiplexer 30 from the processor 10 over connections 34 and 44, or read from the multiplexer to the processor 10 over connections 35 and 46. When second processor 20 is connected to the RAM 40 via the multiplexer 30, data is transmitted from the processor 20 to the RAM 40 via the multiplexer 30 over connections 36 and 44, or read from the RAM 40 via the multiplexer 30 by the processor 20 over connections 37 and 46.

Figure 7:
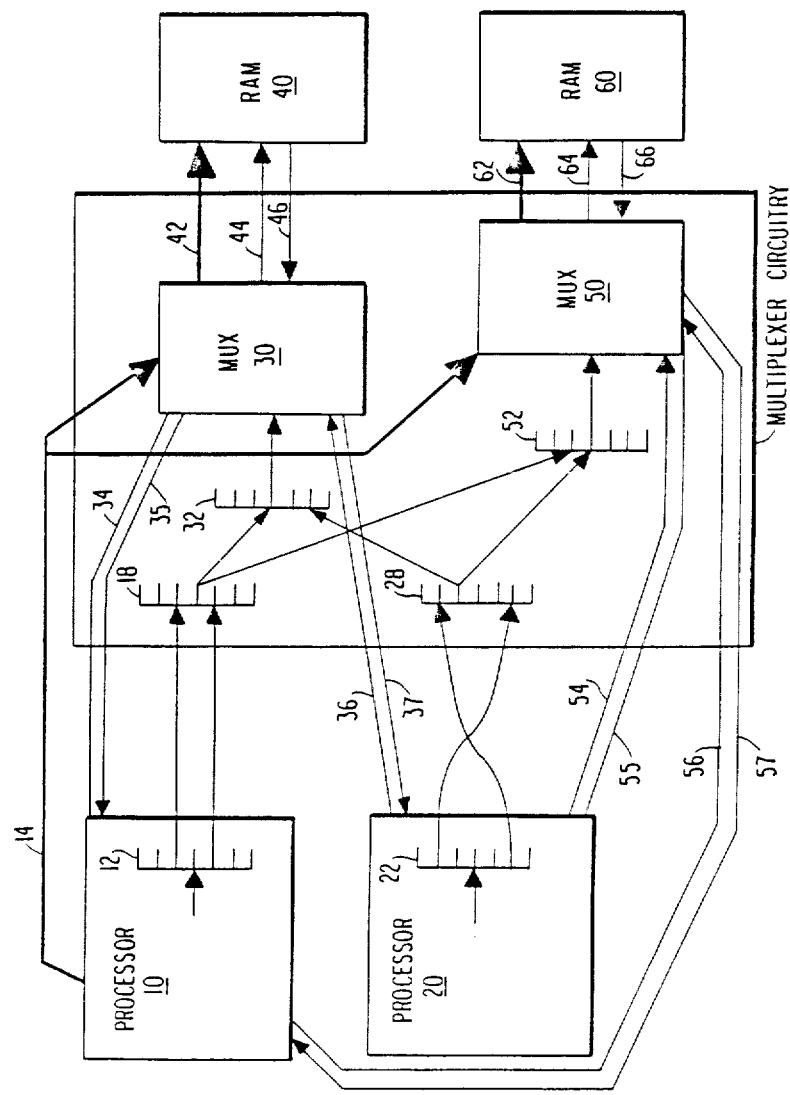
FIG. 7 is a block diagram showing the hardware configuration of the preferred embodiment of the invention using twin RAMs.

To avoid the need for arbitration circuitry, a preferred embodiment uses two RAMs and two multiplexer (MUX) circuits, as shown schematically in FIG. 7. The first processor 10 loads its address register 12 with the address of the data to be read or written, and transmits this address to multiplexer address register 18. The second processor 20 loads its address register 22 with the address of the data to be read or written and transmits this address, transformed as explained in conjunction with FIGS. 2 and 3, to multiplexer address register 28. A gate circuit controlled by first processor 10 via control link 14 assigns one multiplexer-RAM set to each processor and transmits addresses accordingly. Thus when the first processor 10 is assigned to the first multiplexer-RAM set 30 and 40, the address in address register 18 is moved to multiplexer address register 32 and used to access RAM 40 via control connection 42; and data is transmitted between first processor 10 and RAM 40 along connections 34 and 44 (for writing) or 46 and 35 (for reading). Also, the address in address register 28 is moved to multiplexer address register 52 and used to access RAM 60 via control connection 62; and data is transmitted between second processor 20 and RAM 60 via connections 54 and 64 (for writing) or 66 and 55 (for reading).

When these connections are interchanged by the first processing 10, using control link 14 (after 25 milliseconds, in a preferred embodiment), the first processor 10 is assigned to the second RAM-MUX pair 50 and 60, and the second processor 20 is assigned to the first RAM-MUX pair 30 and 40. In this case, address 18 is entered into MUX address register 52, so that data is transmitted along connections 56 and 64 (writing) or 66 and 57 (reading). Address 28 is entered into MUX address register 32, so that data is transmitted along connections 36 and 44 (writing) or 46 and 37 (reading).

In both FIGS. 6 and 7, each RAM 40 and 60 shown may comprise two RAMs each of which holds one byte per address location, and the multiplexers 30 and 50 may perform additional address transformations, as explained in conjunction with FIGS. 3 and 4, to provide efficient access.

The invention provides means to enable two processors to access a single random access memory (RAM) via different addressing systems. The systems perform the required address conversions rapidly using the wiring and addressing scheme disclosed herein. The invention eliminates the need to copy the data to another storage medium or to utilize either processor, or a third processor, to calculate the necessary address conversions.

The invention provides means to enable two processors to access each of two random access memories (RAMs). Each processor is given access to one RAM at a time, and access is interchanged frequently under one processor's control. The system performs the required address conversions rapidly using the wiring and addressing disclosed herein and maintains each processor's continuous access to a RAM without the need for arbitration means.

The invention provides means to enable two processors to store and retrieve sixteen-bit words of information in two eight-bit (byte-sized) RAMs, and to access the combined memory via different addressing systems.

While the invention has been described with reference to specific embodiments, modifications and variations may be constructed and used without departing from the broad teachings of the invention, which are defined in the following claims.

We claim:

1. An apparatus for the alternate addressing of a common memory system for storing and retrieval of digitized information comprising:

first processor means connected to said memory system for writing said digitized information to said memory system, said digitized information written to said memory system being organized as a plurality of channels on a row-by-row basis in said memory system;

second processor means connected to said memory system for reading from said memory system said digitized information in defined segments as a plurality of frames from each of said plurality of channels on a column-by-column basis in said memory system; and switching means for selectively connecting said first and second processor means to different address spaces of said memory system, said first and second processor means having simultaneous access to said memory system.

2. The apparatus recited in claim 1 wherein said switching means comprises multiplexer means responsive to said first processor means for selectively connecting said first and second processor means to said different address spaces, said multiplexer means including first address register means for addressing said different address spaces, said apparatus further comprising:

second address register means in said first processor means connected to third address register means in said multiplexer means for transferring an address from said first processor means to said multiplexer means; and fourth address register means in said second processor means connected to fifth address register means in said multiplexer means for transferring an address from said second processor means to said multiplexer means;

said multiplexer means further transferring an address from one of said third or fifth address register means to said first address register means to address said different address spaces of said memory system.

3. The apparatus recited in claim 2 further comprising address rearranging means connected to said fifth address register means for rearranging the address transferred from said fourth address register means to said fifth address register means.

4. The apparatus recited in claim 1 wherein said memory system includes twin random access memory means, said switching means alternately connecting said first processor means to a first of said memory means and then to a second of said memory means while alternately connecting said second processor means to said second memory means and then to said first memory means.

5. The apparatus recited in claim 4 wherein said switching means comprises first and second multiplexer means responsive to said first processor means for alternately connecting said first and second processor means to said first and second memory means, said first multiplexer means including first address register means for addressing said different address spaces of said first memory means and said second multiplexer means including second address register means for addressing said different address spaces of said second memory means, said apparatus further comprising:

third address register means in said first processor means connected too fourth address register means in said switching means for transferring an address from said first processor means to said switching means; and fifth address register means in said second processor means connected to sixth address register means in said switching means for transferring an address from said second processor means to said switching means;

said switching means further alternately transferring an address from one of said fourth or sixth address register means to said first address register means to address different address spaces of said first memory means and alternately transferring and address from one of said sixth or fourth address register means to said second address register means to address different address spaces of said second memory means.

6. The apparatus recited in claim 5 further comprising address rearranging means connected to said sixth address register means for rearranging the address transferred from said fifth address register means to said sixth address register means.

7. The apparatus recited in claim 6 wherein said segments are 2-byte words.

8. The apparatus recited in claim 7 wherein said second processor includes address means for reordering said 2-byte words by interchanging high order and low order bytes on odd addresses.

* * * * *